J. A. CAPOCEFALO & R. L. KING, Jr.
ELECTRIC GEAR SHIFTER.
APPLICATION FILED SEPT. 5, 1916.

1,219,808.

Patented Mar. 20, 1917.
3 SHEETS—SHEET 1.

WITNESS
Walter L. Fay.

INVENTORS
JOHN A. CAPOCEFALO.
ROSS L. KING JR.
BY
Harry D. Wallace
ATTORNEY

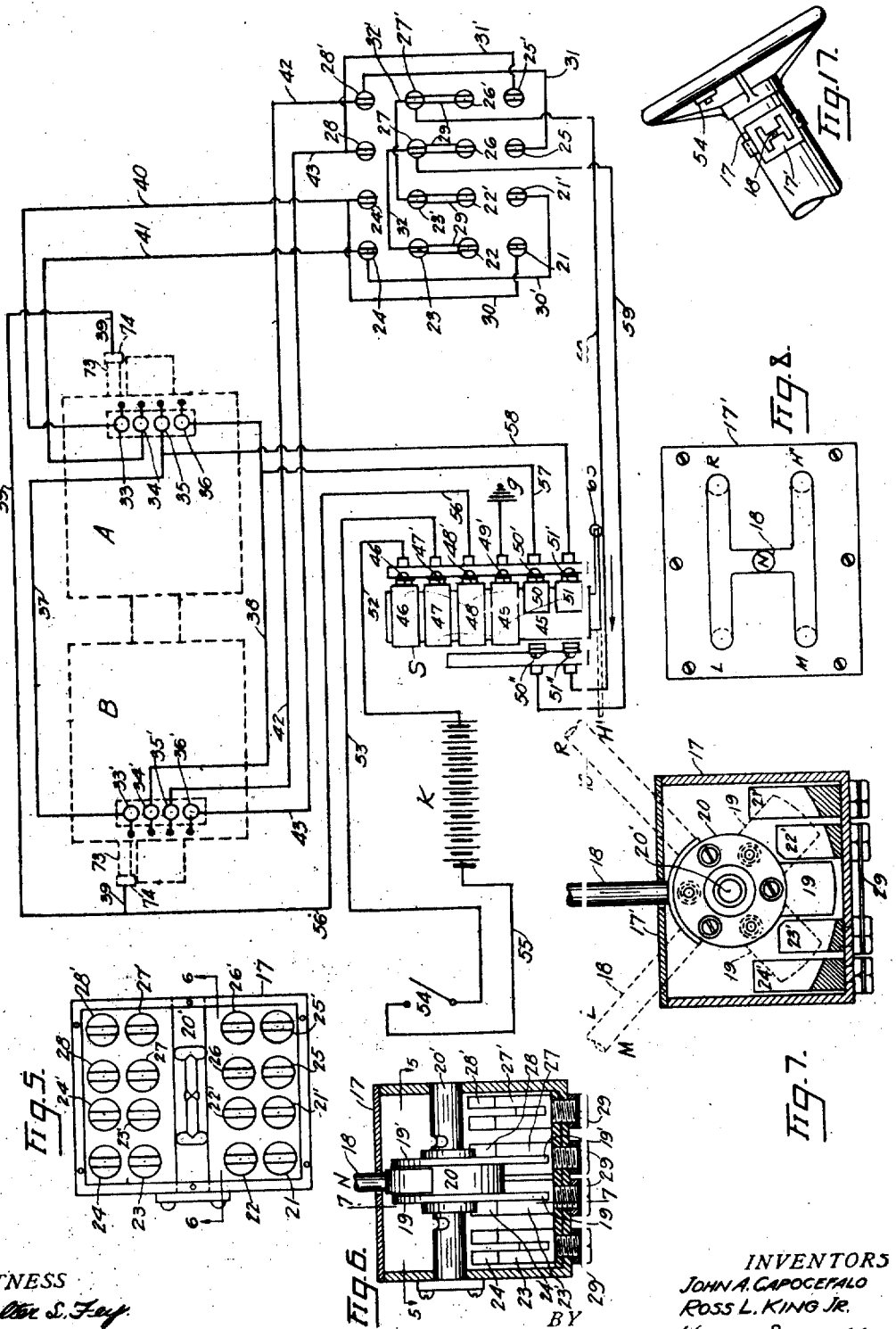

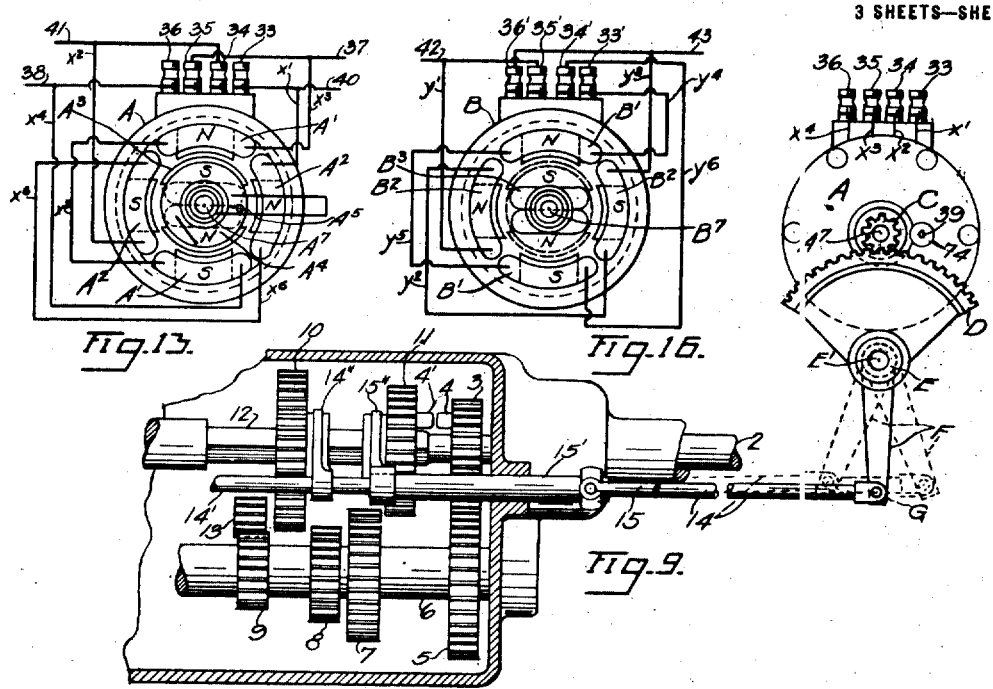
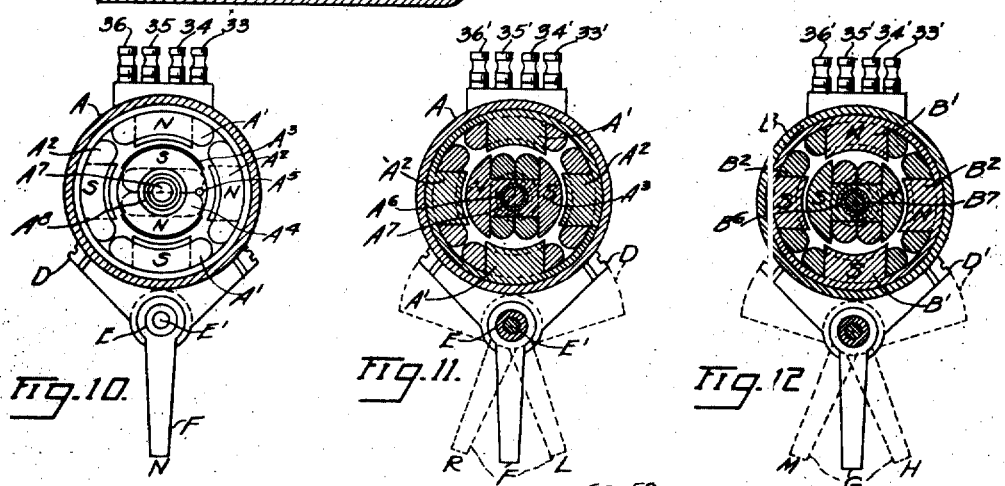
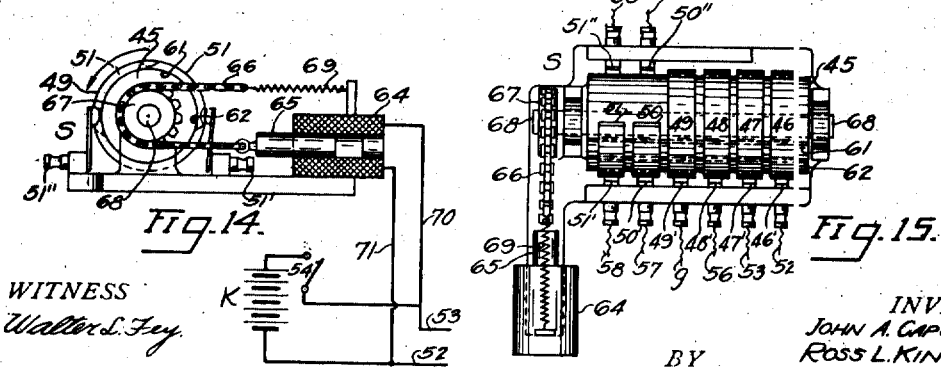

UNITED STATES PATENT OFFICE.

JOHN A. CAPOCEFALO AND ROSS L. KING, JR., OF SYRACUSE, NEW YORK; SAID CAPOCEFALO ASSIGNOR TO BRUCE L. KING, OF SYRACUSE, NEW YORK.

ELECTRIC GEAR-SHIFTER.

1,219,808. Specification of Letters Patent. Patented Mar. 20, 1917.

Application filed September 5, 1916. Serial No. 118,555.

*To all whom it may concern:*

Be it known that we, JOHN A. CAPOCEFALO and ROSS L. KING, Jr., citizens of the United States, residing at Syracuse, in the county of Onondaga and State of New York, have invented certain new and useful Improvements in Electric Gear-Shifters, of which the following is a specification.

This invention relates to improvements in electric gear shifters, designed particularly for use in connection with automobiles and other motor vehicles, and has for its object to provide means for readily and quickly changing the gears of the speed mechanism. A further object is to provide powerful and positive means controlled entirely by electricity for automatically shifting the gears for producing the various speeds in the forward, as well as, the reverse directions. A further object is to provide novel, simple and positive selective mechanism located within easy reach of the operator. And a further object is to provide means for conserving the electric power employed for operating the whole shifting mechanism.

We attain these objects by the means set forth in the detailed description which follows, and as illustrated in the accompanying drawings, in which—

Figure 1:
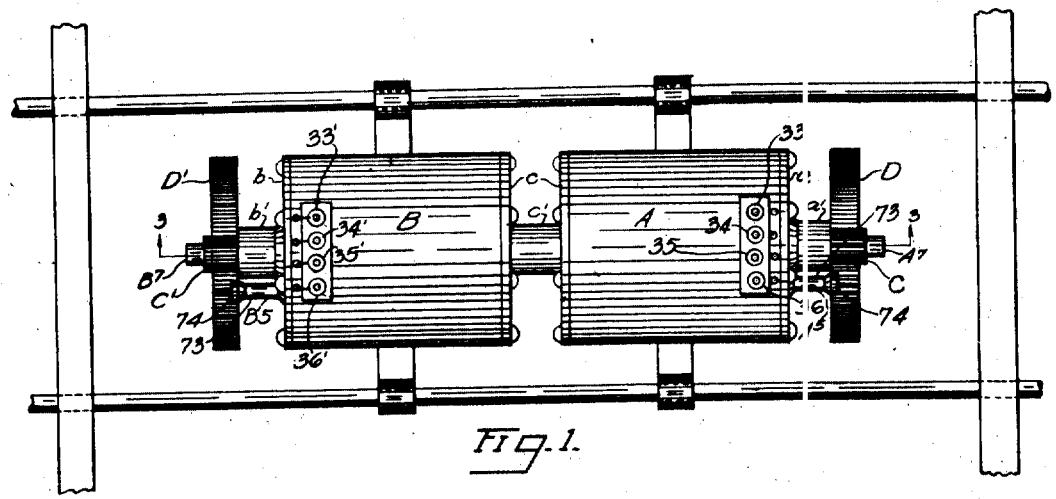
Figure 2:
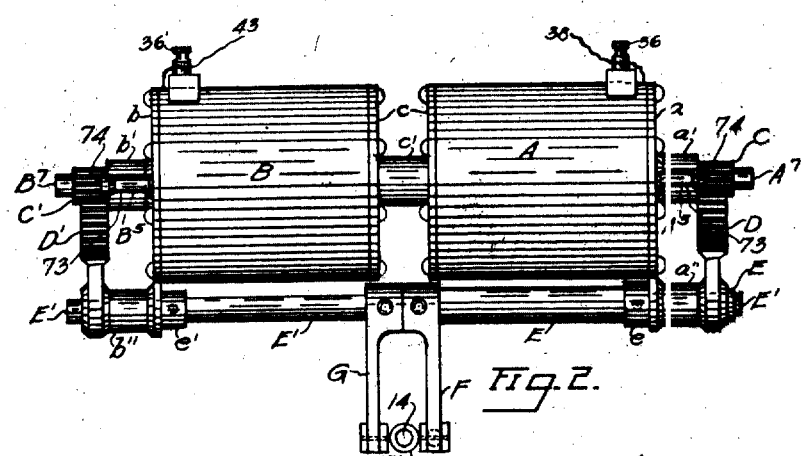
Figure 3:
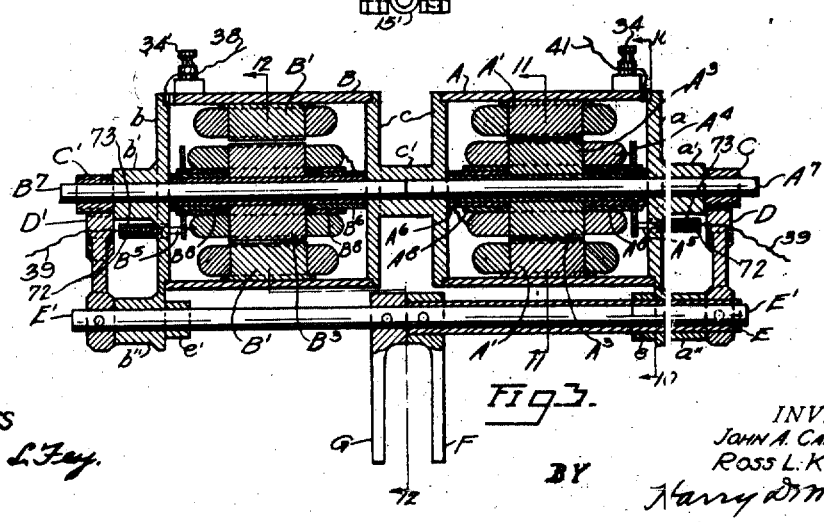

Figure 1 is a top-plan view of the gear-shifting mechanism applied to the chassis of an automobile. Fig. 2 is a side elevation of the same. Fig. 3 is a central longitudinal section, taken on line 3—3 of Fig. 1; showing the internal construction and arrangement of the motor-like shifters. Fig. 4 is a view illustrating diagrammatically the complete invention; showing the electric connections and circuits. Fig. 5 is a horizontal section through the selective switch, certain parts being omitted, taken on line 5—5 of Fig. 6. Fig. 6 is a vertical cross-section of the same, taken on line 6—6 of Fig. 5. Fig. 7 is a vertical longitudinal section, taken on line 7—7 of Fig. 6. Fig. 8 is a top-plan view of the selective or H-switch. Fig. 9 is a view partially in end elevation and partially in section; showing the gear changer applied to the usual transmission gears of an automobile. Fig. 10 is a vertical cross-section, taken on line 10—10 of Fig. 3; showing the neutral positions of the armatures and fingers. Fig. 11 is a similar sectional view, taken on line 11—11 of Fig. 3; showing the construction and arrangement of the several magnetic fields and the armature, the latter being in position to change the gears to certain speeds. Fig. 12 is a similar sectional view, taken on line 12—12 of Fig. 3; showing the position of the armature for changing the gears for certain other speeds. Fig. 13 is a diagrammatic view of the field and armature circuits of Fig. 10. Fig. 14 is an end elevation of the cylinder switch. Fig. 15 is a top-plan view of the same. Fig. 16 is a diagrammatic view of the field and armature circuits of Fig. 12. Fig. 17 is a view of a steering-wheel supporting two of the switches.

The main parts of our gear-shifting mechanism, comprise two cylinders A and B, arranged concentrically, the remote ends of which are closed by removable caps or heads $a$ and $b$; while the adjacent ends are closed by a common part $c$ having a bearing-neck $c'$. Interiorly the cylinders A—B are arranged substantially alike, and a particular description of the cylinder A will also describe cylinder B. Each cylinder is provided with four electro-magnetic fields similar to those in motors, in which $A'$ represents the top and bottom or neutral fields, and $A^2$ represents the right and left shift-fields. Each pair of said fields are connected in series, as shown in Figs. 10, 11, 12 and 13. The corresponding pairs of fields in the cylinders A and B are in parallel. An armature or rotor is disposed concentrically between the four fields, and has a single winding $A^3$, one end of which connects with a disk $A^4$, which is engaged by a spring-pressed brush $A^5$, while the other end of said winding is grounded on a brass sleeve $A^6$ carried by the armature shaft $A^7$, the said shaft having its bearings in the hub $a$ and part of the neck $c$. $A^8$ represents a cylindrical insulation, which is disposed at each end of the iron body of the armature and separates the field from the sleeve $A^6$. The brush disk $A^4$ is mounted upon said insulation. Upon the outer ends of the armature shafts are mounted pinions C and $C'$, which mesh with segment-gears D and $D'$, the gear D being mounted directly upon a sleeve E which is journaled in a hub $a''$; while the gear D' is mounted upon a shaft E' which is journaled in a hub $b''$, the said hubs depending from the caps $a$—$b$ respectively. Fingers or shifters F and G which operate the transmission gears are rigid, respectively on the sleeve E and the shaft E'. The changing of the transmission gears is accomplished by the partial rotation of the armatures $A^3$ and $B^3$, which rotate the gears D and D' for imparting lateral movements to fingers F and G, to about the extent shown by the dotted lines in Figs. 9, 11 and 12. Sleeve E and shaft E' are respectively held in place by collars $e$ and $e'$.

In the transmission gears, 2 represents the main engine shaft, upon which is rigidly mounted the fast gear 3, having a clutch member 4. The gear 3 meshes with a gear 5, which is rigid on a countershaft 6, which supports gears 7, 8 and 9, the latter shaft and gears being continuously driven while the car is in motion. 10 and 11 represent gears which are slidably mounted on a driving shaft 12 which connects with the wheels of the vehicle. The shaft 12 is square, so that the gears 10 and 11 rotate with it. An idler gear 13 meshes with the gear 9 and is employed for reversing the motion of the vehicle and for the reverse motion the gear 10 meshes with the idler 13. The first speed forward or low, is obtained by the meshing of gear 10 with gear 8. The second speed forward or medium speed is obtained by the meshing of gear 11 with gear 7, and for the third or high speed forward a clutch member 4' carried by gear 11 engages clutch member 4 on gear 3. For the neutral or stop position, gears 10 and 11 are disengaged from the other gears. A rod 14 connects finger F with another rod 14' which carries a yoke 14'' for shifting gear 10; while a rod 15 connects finger G with a sleeve 15', the latter carrying a yoke 15'' which operates gear 11.

The whole shifting mechanism is controlled primarily by a selective electric switch, which throughout the description will be designated the H-switch, which will now be described: 17 represents a casing preferably of insulating material, having a cover 17' in which is an H-shaped slot for the play of an operating handle 18. Within box 17, preferably upon its bottom are disposed sixteen contacts, all having slits to receive knives 19 and 19', the latter being mounted on a barrel 20 journaled on a shaft 20' and to which the handle 18 is connected. The barrel 20 is preferably made of insulation so that knives 19—19' are insulated from each other and from the handle. The contacts are numbered as follows: 21, 21', 22, 22', 23, 23', 24, 24', 25, 25', 26, 26', 27, 27', 28 and 28'. The contacts 22—23, 22'—23', 26—27, and 26'—27' are respectively connected by bars 29. Contact 21 is connected to 24' by a wire 30; contact 21' is connected to 24 by a wire 30'; contact 25 is connected to 28' by a wire 31, and contact 25' is connected to 28 by a wire 31'. Contacts 23 and 27 are connected by a wire 32, and contacts 23' and 27' are connected by a wire 32'.

The cylinder A is provided with four binding-posts, as 33 and 34, which connect respectively with the two fields $A^2$ by wires $x'$ and $x^2$, and 35 and 36 which connect respectively with the two fields A' by wires $x^3$ and $x^4$. Fields A' are connected by wire $x^5$, and fields $A^2$ are connected by wire $x^6$ (see Figs. 10 and 13). The cylinder B is also provided with four binding-posts, as 33' and 34', which connect respectively with the two fields $B^2$ (Fig. 16), and binding-posts 35' and 36' which connect respectively with the two fields B' the same as for cylinder A. Binding posts 35 and 36 of cylinder A connect with binding-posts 33' and 34' by wires 37 and 38 respectively. The two brushes $A^5$—$B^5$ are connected together by a wire 39. The post 33 of cylinder A connects with contact 24' of the H-switch by a wire 40; while post 34 connects with contact 24 by a wire 41. Binding-post 35' of cylinder B connects with contact 28' by wire 42; while post 36' connects to contact 28 by a wire 43.

The source of electric energy is preferably a storage battery K, the current of which is controlled, after the H-switch has been set, by a cylinder-switch, which is indicated diagrammatically at S in Fig. 4 in connection with the several circuits. The latter switch comprises a cylinder 45, preferably of insulating material, upon which is mounted a number of annular contacts 46, 47, 48 and 49, and two segment contacts 50 and 51, also a plurality of spring-contacts which engage the former contacts, as 46', 47', 48' and 49', all of which are constantly in engagement with the annular contacts, and 50', 51', 50'' and 51'', which are alternately in engagement with the segment contacts 50 and 51. The contact 46 connects with one pole (preferably the positive) of the battery K by a wire 52; contact 47 connects by a wire 53 with a switch 54, which may be located on the steering-wheel (see Fig. 17), and a wire 55 connects the latter switch with the opposite (or negative) pole of the battery K. Contact 48' connects with the brush wire 39 by a wire 56; contact 49' to a ground, as at $g$; contact 50' connects by a wire 57 to the wire 38 and therefore to binding-posts 34' and 36; while contact 51' connects by a wire 58 to wire 37 and therefore to binding-posts 33' and 35. Contact 50'' connects by a wire 59 to contact 27 of the H-switch; while segment 51'' connects by a wire 60 to contact 27' of the H-switch. In the cylinder or S- switch, the annular contacts 46, 48 and segment 50 are electrically connected by a wire 61 which is embedded in the cylinder 45. Annular contacts 47, 49 and segment 51 are connected in similar manner by a wire 62 (see Fig. 15).

The S-switch may be operated by any suitable means, as by a rod 63 (Fig. 4) which may connect with a foot lever or pedal (not shown), or by a solenoid magnet 64 shown in Figs. 14 and 15, in which the plunger 65 connects with one end of a sprocket-chain 66, the latter operating a sprocket-gear 67 rigid on shaft 68 of the S-switch. The opposite end of chain 66 is connected to a spring 69, employed for restoring the cylinder 45 to the normal position shown in Figs. 4, 14 and 15. The drawing of the plunger 65 into the coil of magnet 64 rotates cylinder 45 to the left (Figs. 4 and 14) sufficiently to bring contacts 50 and 51 into engagement with contacts 50'' and 51'' and at the same time breaking the connections between said segments and contacts 50' and 51'. The closing of the circuit 50—50'' and 51—51'' is only momentarily, or while the switch 54 is held closed. The latter switch may be in any form, and may be located in any position within easy reach of the operator. In Fig. 14, we have shown the electrical connections for the solenoid magnet 64 in connection with the battery K, in which 70 represents a wire which connects one side of the magnet coil with wire 53 (and switch 54); while a wire 71 connects the opposite side of the coil with wire 52 (and battery K).

The operation of our gear-shifting mechanism is as follows: Assuming that a car equipped with our apparatus is standing still, the transmission gears being in the position shown in Fig. 9, the fingers F—G in the position shown in full lines in Figs. 9, 10, 11 and 12, the S-switch as indicated in Figs. 4, 14 and 15, and the H-switch as shown in Figs. 6, 7 and 8, the armatures $A^3$ and $B^3$ are then in the positions shown in Figs. 10 and 12, wherein the south and north poles of said armature are opposite, or correspond to the north and south poles of the fields A' and B'. These are the neutral positions for all of the above described parts, and if the switch 54 should be closed, and at the same time the S-switch should be operated in the direction of the arrows in Figs. 4 and 14, all of the neutral fields A' and B' and also the fields of the armatures or rotors $A^3$ and $B^3$ would be energized, but the armatures would stand still, owing to the relative positions of the respective poles, as shown in Fig. 10.

To change the speed gears from neutral to first or low speed, the operator first moves handle 18 of the H-switch from the full-line or neutral position to that indicated at L in Figs. 7 and 8. This connects the knives 19 and 19' with contacts 21—22 and 21'—22'. He next closes the switch 54 and rotates the S-switch, so as to shift segments 50 and 51 from contacts 50' and 51' to contacts 50'' and 51''. The battery current then flows from the positive pole through wire 52 to annular contacts 46—48 and segment 50 (through wire 61) to contact 50'', wire 59, contact 27, wire 32, contacts 23, 22, 21, wires 30 and 40 to binding-post 33, wire $x'$ to one field $A^2$ via wire $x^0$, to the other field $A^2$, through wire $x^2$ to post 34, wires 41 and 30' to contacts 21', 22', 23', wire 32', contact 27', wire 60, contact 51'', segment 51, wire 62, contacts 49, 47, wire 53, switch 54 and wire 55 to the negative pole of the battery. The breaking of contacts 50—51 and 50' and 51' deënergizes the neutral fields A' and B' and also the armature $A^3$—$B^3$, but immediately upon the making of contacts between 50—51 and 50'' and 51'' energizes the fields $A^2$, and also reënergizes the armature $A^3$, in the proper direction for rotating said armature to the right, or to the dotted position shown in Fig. 11, which rocks the segment gear D, for moving finger F to the right (Figs. 9–11). This meshes gear 10 with gear 8, for the first or low speed.

To change the gears, for reversing the travel of the vehicle, handle 18 of the H-switch is swung in the opposite direction to the dotted position K in Figs. 7 and 8; then switch 54 is closed and the S-switch operated as before. The armatures and neutral fields are again energized while contacts 50—51 are leaving 50' and 51', as explained, and the making of contacts 50—51 and 50'' and 51'' causes the current to flow from the positive pole of battery K through wire 52 to wire 59 and contact 27, thence through wire 32 to contact 23, knife 19, contact 24, wire 41, binding-post 34, fields $A^2$ via wires $x^0$ and $x'$ to post 33, wire 40, contact 24', knife 19', contact 23', wire 32', contact 27', wire 60, back to the negative pole of the battery through the S-switch, wire 53, switch 54 and wire 55. This rotates armature $A^3$ and also finger F, from the extreme right first to the neutral and then to the extreme left positions shown in Figs. 9 and 11, and brings gear 10 into mesh with idler gear 13, which is operated by gear 9, and reverses the motion of the vehicle. It will be understood that in this last operation the current of battery K is reversed in the lines 40—41 by the H-switch, which affects the reversal of the polarity of the fields $A^2$, from that shown in Fig. 10. But the polarity of the armature $A^3$, and in fact both armatures, always remains the same while that of the shift-operating fields change, as explained. Hence the armature $A^3$ is attracted in the opposite directions for affecting the first and the reverse change of the gears. The handle of the H-switch should be returned to the central or neutral position for safety, unless the speed gears are to be presently changed.

To change from the first, to second or medium speed, the operation is as follows: Shift handle 18 to the position indicated at M in Fig. 8, which corresponds to position L in Fig. 7. This connects knives 19—19' with contacts 25, 26, 25' and 26'. Then the closing of switch 54 and the operation of S-switch results first in restoring armature $A^3$ and finger F to the neutral position and leaves them there, while subsequently the shifting work is transferred to and effected by cylinder B, without any change of the said switches, in the following manner: The current flows from the positive pole of battery K via wire 52, through the S-switch to wire 59, contacts 27, 26, 25, wire 31 and contact 28' to wire 42, binding-post 35', fields $B^2$ and wires $y'$, $y^2$ and $y^3$ to post 36', wire 43, contact 28, wire 31', contacts 25', 26', 27' and wire 60 to contact 51'', 51, 62, wire 53, switch 54 and wire 55 to negative pole of battery. During this same interval, armature $B^3$ is energized, and at the start of the operation the relative positions of the parts, and the polarity of the armature $B^3$ and fields $B'$ and $B^2$ are as shown in Fig. 16. Thus armature $B^3$ is attracted by the fields $B^2$ and rotated toward the left, which swings finger G in the same direction and shifts gear 11 into mesh with gear 7, which effects the change from first to second speed.

To shift the gears for high speed, the handle 18 of the H-switch is swung to the dotted position indicated at H' in Figs. 7 and 8, which engages knives 19—19' with contacts 27—28 and 27'—28' respectively. Then by closing switch 54 and operating S-switch as before, the neutral fields and the armature $B^3$ are momentarily energized while the segments 50 and 51 are passing from contacts 50' and 51', which causes the armature $B^3$ to be attracted by fields $B'$ for moving it back to neutral position. The next instant the segments 50—51 engage contacts 50'' and 51'', which sends the current from the positive pole of battery K through wire 52 to wire 59, contacts 27, 28 to wire 43, binding-post 36', wire $y^3$, fields $B^2$ via wires $y^2$ and $y'$ to post 35' and wire 42, contacts 28' and 27', wires 60 and 53, switch 54 and wire 55 to negative pole of battery. In this last operation, the polarity of the fields $B^2$ is reversed, as compared with the last preceding operation (see Fig. 16), and thus armature $B^3$ is rotated to the right, first to the neutral position by the energizing of the neutral fields $B'$ and said armature, and then to the extreme right position shown by dotted lines in Fig. 12, through the H-switch. This swings finger G to the right, and brings clutch members 4—4' into engagement so that shaft 2 drives shaft 12 and the vehicle wheels at the high speed.

The foregoing describes all of the operations for changing the gears from neutral to first, reverse, second and high speeds and back to neutral again.

The segments 50 and 51 of the S-switch are of such length that they remain in engagement with the contacts 50' and 51', during the operation of the said switch, a sufficient length of time for effecting the re-energizing of the armatures $A^3$ and $B^3$ and also the neutral fields $A'$ and $B'$, for the purpose of restoring the shifting parts to the neutral position in advance of the extreme right or left movements of the armatures. In other words, the armatures $A^3$ and $B^3$, so far as the control of the H-switch is concerned, never move more than 90° in either direction from the central or neutral positions, although, when the armatures are rotated from the low speed to the reverse, or to second speed, and from second to high speed, there is apparently a single or continuous movement of the armatures through 180°, while in fact the first 90° of the said movement, for example, in the shifting from low to second speed, is accomplished by a momentary energizing of the fields $A'$ and armature $A^3$, by the prolonging of the break between segments 50—51 and contacts 50' and 51', as explained, which sends the battery current through wire 52, contacts 46—48, segment 50, wires 57 and 38 to binding-posts 34' and 36, fields $B'$ and $A'$, posts 33' and 35, wires 37 and 58, contact 51', segment 51, contacts 49 and 47, wire 53, switch 54 and wire 55 to the negative pole of the battery. At the same time the armatures are both energized by their own common circuit, which runs as follows: from the positive pole of battery K, wire 52, contacts 46—48, wire 56 to both of the brushes and the armature fields, thence to a ground on the armature shafts (and at the same time to wire 39), thence from the ground $g$, which is preferably the frame that holds the shifters and has a metallic connection with the shafts $A^7$—$B^7$ to contacts 49', 49, wire 53, switch 54 and wire 55 to negative pole of battery.

The full lines in Figs. 4, 14 and 15 show the S-switch in the normal running or rest position, ready to be operated for shifting the gears, or for restoring the shifting mechanisms to neutral positions. Every time switch 54 is closed while S-switch is in the running position, the two armatures and the neutral fields $A'$—$B'$ are energized, even though the lever 18 of the H-switch be in the neutral position, and if the fingers F—G are in either the right or left dotted positions shown in Figs. 9, 10, 11 and 12, this energizing of said fields and armatures will restore said fingers to the neutral or full line position, shown in the said figures. The shift-fields, as A² and B², are only energized when the segments 50 and 51 of the S-switch are brought into engagement with the contacts 50'' and 51''. Since the S-switch is operated by either a foot-lever or push-button, the duration of the energizing of the shift fields A²—B² is but a few seconds, or long enough to allow the saturation of the windings of said fields and said armatures. The armatures, as well as the neutral fields are always energized in the same direction, or in other words, the polarity of these never changes, because they are not controlled by the H-switch, which is employed for changing the polarity of the fields A² and B², for effecting the different speeds of the transmission gears.

The brushes A⁵ and B⁵ are pressed against the disks A⁴—B⁴ by springs 72 incased in holders 73 supported by the heads a—b, and held in place by screw-caps 74.

Having thus described our invention, what we claim as new and desire to secure by Letters Patent, is—

1. In a speed gear change mechanism for automobiles, speed gear shifters, a pair of armatures for operating said shifters, said armatures connected in parallel, a pair of magnetic fields for positioning each of said armatures and said shifters in neutral position, a pair of magnetic fields for rotating each armature in opposite directions for changing from one speed to another, and a plurality of hand-operated switches for controlling said armatures and said fields.

2. In electric gear shifting mechanism, the combination with the transmission gears and a pair of fingers, of a rotor for operating each of said fingers, the windings of said rotors connected in parallel, magnetic fields for operating each rotor for effecting the changes of said gears for two different speeds, a source of electric current, and manual switch devices for controlling said fields and said rotors.

3. In electric gear shifting mechanism, the combination with transmission gears and shifters for said gears, of two motor-like devices each comprising two neutral fields and two shift-controlling fields and an armature rotatable between said fields for actuating said shifters, a source of electric current, for energizing said fields and armatures, a selective switch, circuits connecting said switch with the shift-controlling fields, a second switch, and a circuit connecting the latter switch with said selective switch.

4. Electric gear shifting mechanism, including a pair of fingers, an armature, and gears for operating each finger, electromagnetic fields for rotating said armatures in opposite directions, a selective switch determining the movements of said armatures, a source of electric current, and a cylinder switch for controlling the energizing of said fields and said armatures.

5. Electric gear shifting mechanism, including a pair of fingers, an armature and gears for operating each finger independently of the other, electro-magnetic fields for rotating each armature in opposite directions, a selective switch adapted to determine certain movements of said armatures, a source of electric current, and a switch for controlling the energizing of said fields through said selective switch, and the energizing of said armature independently of said selective switch.

6. Electric gear shifting mechanism, including two electro-magnetic devices, each having a pair of neutral fields, a pair of shift-controlling fields, and an armature rotatable between said fields, the armatures of the two devices connected in parallel, the neutral fields of said devices connected in parallel, and the shift-controlling fields of said devices connected in parallel, a source of electric current, a selective switch determining the polarity of said shift-controlling fields, a switch controlling the energizing of all of said fields and also said armature, and a gear-shifting finger operatively connected to each of said armatures.

7. Electric gear shifters, including a pair of fingers connected with the transmission gears of an automobile, a rotatable armature geared to each finger, magnetic fields for rotating one of said armatures in opposite directions for changing the gears for first and reverse speeds, magnetic fields for rotating the other armature in opposite directions for changing said gears for second and third speeds, a source of electric current, a selective switch, circuits connecting said switch to certain of said fields, and a switch controlling the energizing of all of said fields and also said armatures.

8. Electric gear shifters, comprising gear-shifting fingers, rotatable armatures geared to said fingers and operable independently for actuating first one, and then the other of said fingers, electro-magnetic fields controlling said armatures, a source of electric current, a selective switch connected to certain of said fields, a switch controlling the flow of the current through said selective switch for energizing the windings of said last named fields, and also the energizing of said armature, and a third switch controlling the current which operates all the said shifting parts.

9. Electric gear shifting mechanism, comprising two electro-magnetic devices, each having two neutral and two shift-controlling fields and a rotatable armature actuated by said fields, gear shifters connected with and operated by said armatures, a source of electric current, an electric circuit for the neutral fields of both devices in parallel, electric circuits including the shift-controlling fields of both devices in parallel, a selective switch included in the circuits of said shift-controlling fields, a switch controlling the current to said armatures, said neutral and said shift-controlling fields, and also to said selective switch, and a third switch controlling the current from said source to all of said parts.

10. Electric gear shifter, comprising a pair of fingers for changing the transmission gears of a motor vehicle, a motor-like device for operating each finger consisting of a pair of neutral and a pair of shift-controlling fields and an armature rotatable within said fields, a source of electric current, a means for energizing the neutral fields of each of said devices and each armature independently, and means for selectively energizing the shift-controlling fields of each of said devices independently.

11. Speed changing mechanism for automobiles, including means for shifting the transmission-gears, rotatable electric devices controlling said means, electromagnets controlling said devices, a source of electric current, a selective switch determining the direction of rotation of said devices away from neutral positions, a switch controlling the direction of rotation of said devices toward the neutral positions, and a switch for opening and closing the circuit which supplies said current to all of said parts.

12. Speed changing mechanism for automobiles, comprising two cylinders, a plurality of magnetic fields in each cylinder, arranged in pairs, a rotatable armature in each cylinder, a source of electric current, means for energizing one pair of magnetic fields in each cylinder for positioning said armatures in the neutral position, means for energizing the second pair of magnetic fields in each cylinder for changing the transmission gears for two different speeds including the reverse speed, and a selective electric switch for controlling the last named magnetic fields.

13. Speed changing mechanism for automobiles, comprising a plurality of electromagnetic fields arranged in pairs, two rotatable armatures, each controlled by two pairs of said fields, one pair of said fields for positioning each armature in the neutral position, one pair of said fields for actuating one armature for changing the transmission gears for first and reverse speeds, a pair of said fields for actuating the other armature for changing said gears for second and third speeds, fingers for operating said gears, one finger controlled by each armature, and a pinion and a segment-gear connecting each armature to the corresponding finger.

14. Speed changing mechanism for automobiles, including two armatures, a plurality of magnetic fields surrounding each armature arranged in pairs, a pinion on the shaft of each armature, a segment gear rocked by each pinion, a gear changing finger connected with each segment gear, a brush for supplying electric current to the winding of each armature, a selective switch controlling two pairs of said magnetic fields, and a switch controlling the energizing of said armatures and two pairs of said magnetic fields.

15. Speed changing mechanism for automobiles, including gear-changing fingers, reversible rotary armatures for rocking said fingers, a pair of magnetic fields for positioning each armature and the corresponding finger in the neutral position, a pair of magnetic fields for positioning one armature for changing the transmission gears from neutral to first speed and for reversing the motion of a vehicle, a pair of magnetic fields for positioning the other armature for changing said gears to second and third speeds, a switch controlling the energizing of the armatures and neutral fields for restoring the armatures and fingers to neutral position after each change of said gears, and a switch for changing the polarity of certain of said magnetic fields.

16. In electric gear shifting mechanism, the combination with the transmission gears and a pair of fingers, of a rotor for operating each of said fingers, the windings of said rotors connected in parallel, magnetic fields for operating each rotor for effecting the change of said gears to two different speeds, a selective switch connected to said fields, a source of electric current, and a switch controlling the energizing of said fields and said rotors.

17. Electric gear shifter, including a pair of fingers connected with the transmission gears of an automobile, a rotatable armature geared to each finger, electromagnetic means for positioning each armature in the neutral position, electromagnetic means for rotating one armature in opposite directions for changing the gears for first and reverse speeds, electromagnetic means for rotating the other armature in opposite directions for changing said gears for second and third speeds, a source of electric current, and means for selectively energizing said electromagnetic means and said armatures.

18. In electric gear shifting mechanism, the combination with the transmission gears of an automobile and a pair of fingers, of a rotatable electric device geared to each of said fingers, electromagnetic means for positioning said devices in the neutral position, electromagnetic means for rotating one of said devices independently of the other for effecting the changing of said gears for two speeds, electromagnetic means for rotating the other of said devices for effecting the changing of said gears for two additional speeds, a source of electric current, and a switch and a solenoid magnet for controlling the energizing of said devices and said electromagnetic means.

19. In gear changing mechanisms for automobiles, two motor-type gear shifters, each comprising a rotor, the said rotors connected in parallel, each shifter having two electromagnetic fields adapted for positioning said rotors in neutral position and two electromagnetic fields for positioning said rotors for changing the transmission gears for two different speeds, a selective electric switch, electric circuits connecting said switch with certain electromagnetic fields in each shifter, a cylinder switch, an electric circuit connecting said cylinder switch with said selective switch, an electric circuit connecting said cylinder switch with said selective switch, an electric circuit connecting said cylinder switch with said rotors and said first fields, a circuit connecting said cylinder switch with a source of electric current, and a third switch controlling all of said parts.

20. Electric gear shifting mechanism, including two cylinders arranged tandem, four electric magnetic fields to each cylinder, a rotatable armature in each cylinder, the shafts of said armatures in line axially, a pinion carried by each armature shaft, a segment gear engaged by each pinion, a sleeve supporting one of said gears, a shaft supporting the other gear and journaled in said sleeve, gear-shifting fingers mounted on said sleeve and shaft, a source of electric current, and means for selectively energizing said fields and said armatures for operating said fingers.

21. Electric gear shifting mechanism, comprising two electromagnetic-field devices arranged tandem, rotatable armatures in said devices operable independently, a sleeve and a shaft journaled in said sleeve arranged parallel to the axis of said armatures and supporting gear changing fingers, gears connecting the armatures to said sleeve and shaft, a source of electric current, a selective electric switch connected to said devices, and a switch controlling the energizing of said device and said armature.

22. A speed gear changing mechanism for automobiles, speed gear shifters, an armature for operating each shifter, said armatures connected in parallel, and operable independently, magnetic fields for positioning each armature and corresponding shifter, in the neutral position, magnetic fields for rotating each armature in opposite directions from neutral position for changing from one speed to another, and a plurality of electric switches for controlling said armatures and said fields.

23. In electric gear shifting mechanism, the combination with transmission gears and gear shifting fingers, a rotor connected to each finger, said rotors connected in parallel and operable independently, electromagnetic means for positioning each rotor for changing said gears for two different speeds, electromagnetic means for positioning said fingers in the neutral position, a source of electric current, and hand operated switches for controlling the said fingers and said rotor.

24. In electric gear shifting mechanism, the combination with transmission gears and shifters for said gears, of two motor-like devices each comprising neutral fields and shift-controlling fields and armatures rotatable between said fields for actuating said shifters, a source of electric current, and selective electric means for controlling said device.

25. Speed changing mechanism for automobiles, including means for shifting the transmission gears, rotatable electric devices, a source of electric current, a selective switch determining the direction of rotation of said devices away from neutral position, and a switch controlling the direction of rotation of said devices toward the neutral position.

In testimony whereof we affix our signatures.

JOHN A. CAPOCEFALO.
ROSS L. KING, Jr.